Aug. 23, 1966 R. R. DENMAN 3,268,322
GLASS FORMING APPARATUS
Filed April 13, 1961 2 Sheets-Sheet 1
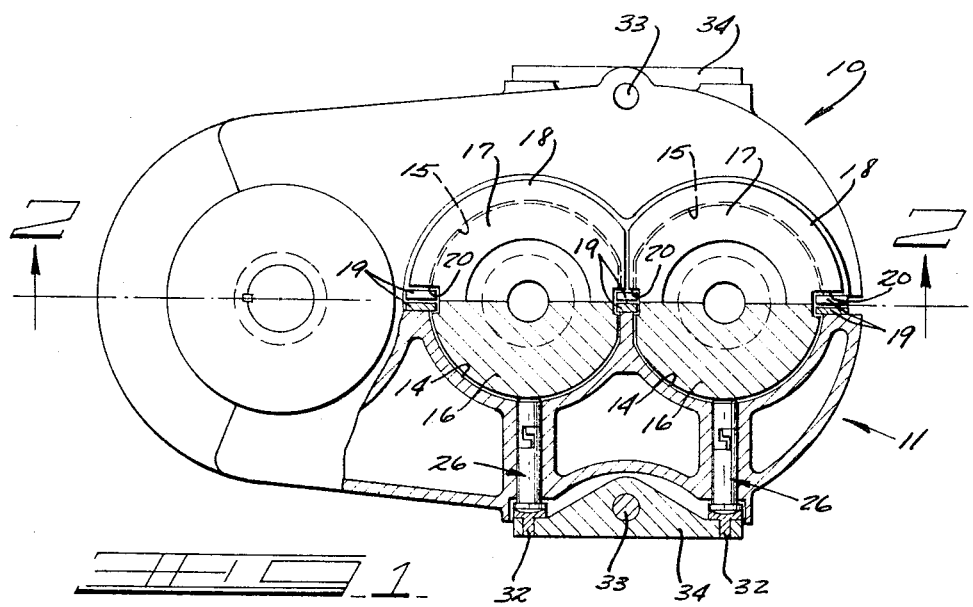
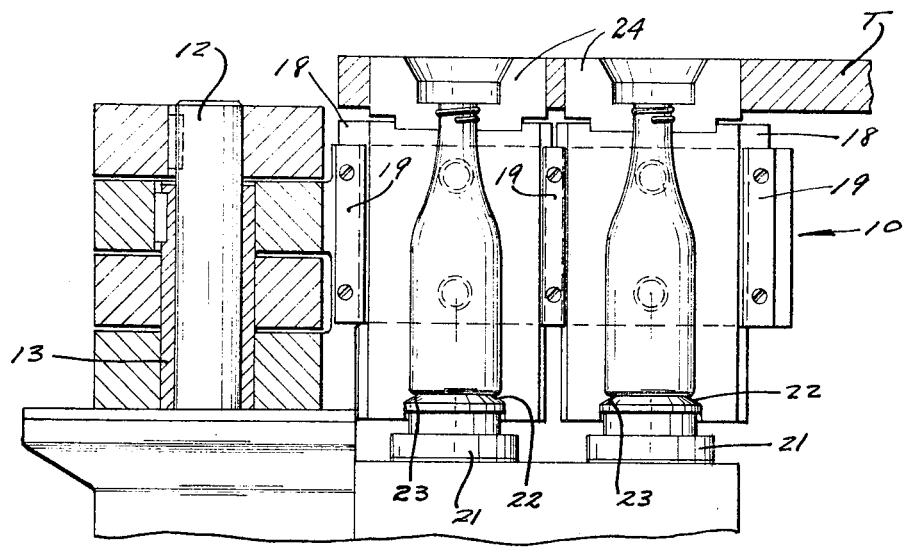
INVENTOR.
ROBERT R. DENMAN
BY J. T. Innis &
W. A. Schaich
ATTORNEYS

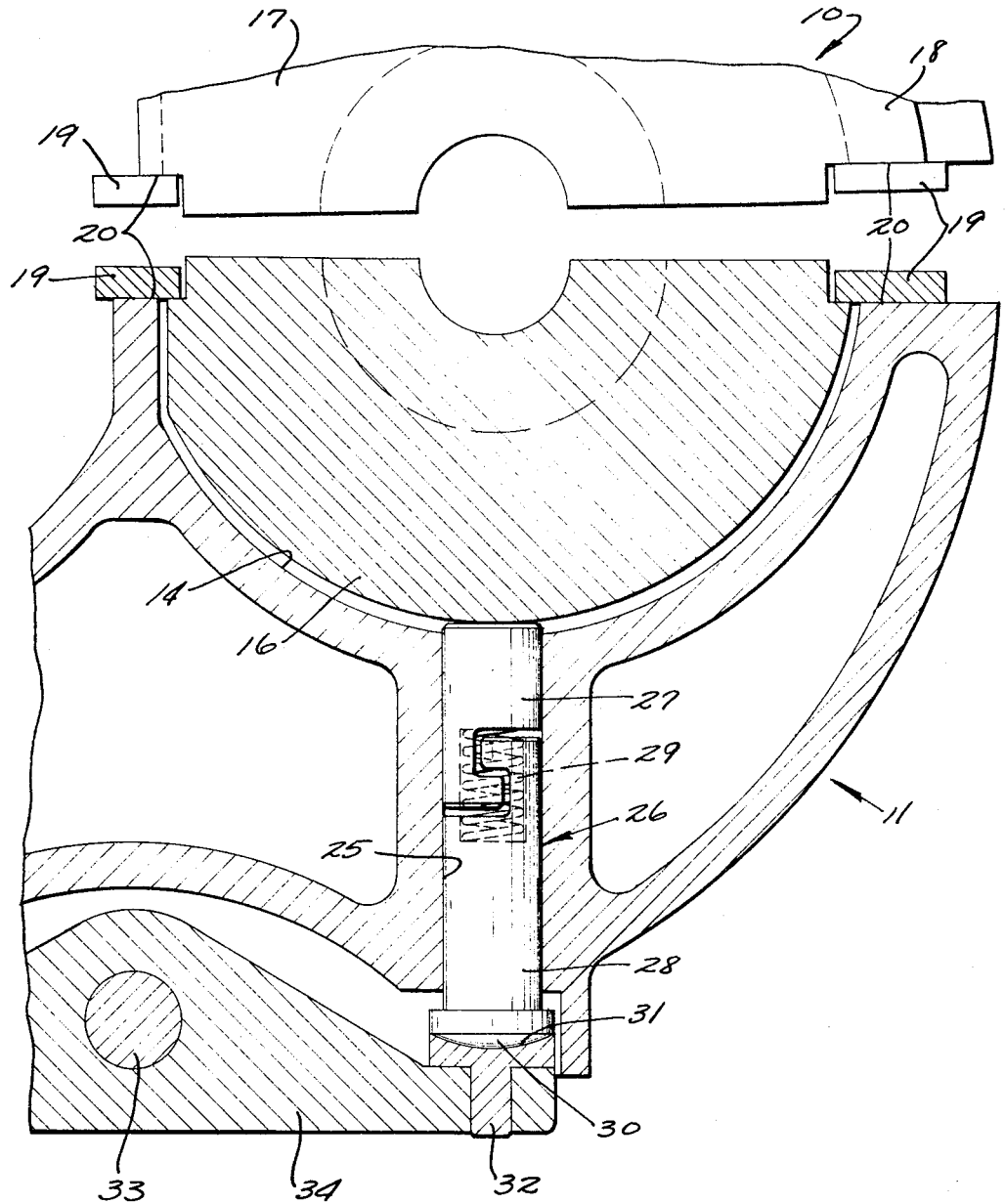

United States Patent Office 3,268,322
Patented August 23, 1966

3,268,322
GLASS FORMING APPARATUS
Robert R. Denman, Toledo, Ohio, assignor to
Owens-Illinois Inc., a corporation of Ohio
Filed Apr. 13, 1961, Ser. No. 102,680
6 Claims. (Cl. 65—323)

This invention relates to molding apparatus and more particularly to apparatus for holding mold halves in their arms in such a fashion as to always exert a force tending to push the molds toward their common center line when closed.

In prior art devices of this type, the mold halves, which are carried by separate, movable mold arms, are mounted in the mold arms with a certain amount of clearance therebetween to allow for what is termed "mold growth." This "mold growth" is due to the heating of the molds by the hot glass which is introduced therein. Continuous operation of the molds will result in thermal expansion of the molds and thus it is necessary to allow the molds to expand within the arms or carriers.

The clearance between the molds and the arms must also be sufficient to allow for horizontal alignment of the molds with respect to neck molds which are positioned by an indexing turret. With the neck molds in position, the blow molds and their arms are closed, and the molds themselves pilot on the undersurface of the neck molds and surround a small portion of the lower part of the neck molds. Molds of this type are usually provided with a flange portion at the top thereof which overlies the top surface of the mold arms. The flange portion serves to prevent the molds in the arms from dropping vertically therefrom. Mold keepers or keys are provided along the faces of the mold arms to prevent the molds from moving horizontally out of the mold arms when the arms are opened. These molds are open at the bottom and it is necessary to close the bottom by the use of a bottom plate. These bottom plates are usually mounted for vertical reciprocation into the bottom opening formed in the mold halves and will seat in this opening to thus provide a completely closed blow mold. During the operation of such a mold, the bottom plates have a tendency to lift the blow mold into contact with the neck mold. After the glass is blown into final form, the bottom plate is retracted, and when the mold halves are opened, they will drop within the arms and thus strike the shoulder portion of the formed ware causing checks or other defects. This is particularly true when the mold arms are unlocked and as they begin to open the forces are released from the mold halves themselves, permitting them to drop until the upper flange rests on the top surface of the mold arm. Furthermore, during the opening motion of the arms, there is a tendency for the molds to become slued around by frictional contact with the bottom plates if the bottom plates are not retracted until after the blow molds are opened.

Therefore, it is an object of this invention to provide apparatus for supporting mold halves within mold arms which obviates the possibility that the molds will shift during the opening motion.

It is an additional object of this invention to provide apparatus for mounting the molds in such a fashion that the molds will not drop when the mold arms are opened.

It is a further object of this invention to provide apparatus for providing molds in mold arms wherein the molds are frictionally retained against the mold keepers when the mold arms are opened.

It is a still further object of this invention to provide apparatus which maintains the molds against the keepers so that the molds are prevented from rotating with respect to each other due to frictional drag with the neck molds or bottom plates.

Additional objects and advantages will be apparent from the following detailed description taken in conjunction with the accompanying drawings wherein:

FIG. 1 is a plan view of the molding apparatus of the invention.

FIG. 2 is a sectional view taken along the line 2—2 of FIG. 1 with the neck molds added.

FIG. 3 is an enlarged view of a portion of FIG. 1 showing the molds partially open.

Referring to FIGS. 1 and 2, a pair of mold arms 10 and 11 are pivotally mounted on a vertical supporting shaft 12. The shaft 12 is rotated about its vertical axis and operates to drive one of the mold arms 11. A concentrically mounted sleeve 13 is rotated in the opposite direction from the rotation of shaft 12 and will rotate the arm 10. The arms 10 and 11 are formed with a pair of semi-cylindrical recesses 14 and 15 formed in the faces thereof which are juxtaposed when the mold arms are moved to closing position. These recesse serve as supporting wall structures for pairs of mold halves 16 and 17. The mold halves 16 and 17 have generally semi-cylindrical external wall shape with the external diameter being slightly less than the internal diameter of the recesses 14 and 15. The top part of the mold halves 16 and 17 are formed with a radially extending flange portion 18. The flange portion 18 will rest on the top part of the mold arms 10 and 11 thus preventing the mold halves 16 and 17 from dropping out of the mold arms. The mold halves 16 and 17 are horizontally retained within the recesses 14 and 15 by vertical keys or keepers 19 which are fixed to the faces of the mold arms with portions thereof extending past the edges of the recesses 14 and 15. The mold halves 16 and 17 have vertically extending keyways 20 formed therein into which keys 19 extend. The keyways 20 are formed somewhat larger than the portion of the keys 19 with which they cooperate. In this manner the mold halves 16 and 17 are loosely retained within the recesses 14 and 15 formed in the mold arms 10 and 11. The mold halves 16 and 17, when closed in cooperating relationship, form the mold walls against which the shoulder and side wall portions of the bottle are blown. The bottom of the mold halves 16 and 17 have an annular recess extending axially thereof into which a bottom plate 21 is adapted to be inserted. The mold halves, when closed, form a downwardly and outwardly tapered surface 22 against which a complementary tapered surface 23 of the bottom plate 21 is adapted to seat when raised into closing position. The height to which the bottom plates 21 are raised each cycle of the machine may be regulated, however, fairly close contact must be made between the surfaces 22 and 23. In making this contact, the mold halves 16 and 17 frequently are slightly lifted with respect to the supporting arms 10 and 11 and brought into firm contact with the relatively stationary neck rings 24. The neck molds are supported and positioned by a turret T (only a portion of which is shown).

Thus it can be seen that as the mold arms 10 and 11 are opened, the force tending to maintain the mold halves 16 and 17 in contact with each other is released and the molds 16 and 17 will drop in the mold arms 10 and 11. When the mold halves 16 and 17 drop, the shoulder portion of the mold halves will touch the shoulder of the formed article causing checks or other defects. In order to prevent the molds halves 16 and 17 from dropping and to insure that they are maintained in alignment during opening and closing of the molds, the mold arms 10 and 11 are formed with a plurality of radially extending openings 25 therethrough opening into the recesses 14 and 15. There are four openings in each mold arm. Two of the openings in each arm open into the same recess at vertically displaced points thereof. The upper openings in the mold arms are in the same horizontal plane as are also the lower openings.

Positioned within the openings 25 are pins 26, the details of which are best shown in FIG. 3. The inner ends of the pins 26 bear against the outer surface of the mold halves. The pins themselves take the form of two interlocked members 27 and 28. Complementary axial passages are formed in both members 27 and 28 at the area of interlock therebetween. Within these passages is positioned a spring 29, under compression, which biases the two members 27 and 28 in opposite directions. The inner end of the member 27, as shown in FIG. 3, is in abutting relationship with respect to the mold half 16. The outer end of the member 28 is in the form of a convex surface 30. This surface 30 seats within a concave cavity 31 formed in an aligning stud 32. At a point midway between the recesses formed in each arm 10 and 11, but laterally displaced therefrom, are vertical shafts 33 mounted for rotation in the mold arms 10 and 11. A horizontal arm 34 having small holes drilled therethrough adjacent its ends, carries the alignment studs 32 seated therein. The center of the horizontal arm 34 is connected to the shaft 33 and is adapted to pivot about the vertical axis of the shaft 33.

The pivotal movement of the arm 34 insures that the force exerted by one of the pins 26 will be equally applied by the other pin 26 acting in the same horizontal plane and on the same side of the mold parting line. Furthermore, the four pins 26 in one mold arm act in force opposition to four pins that are similarly mounted in the other mold arm. Thus equal closing forces will be applied to both sets of mold halves 16 and 17.

As shown in FIG. 3 when the mold halves 16 and 17 are open and out of engagement, the mold halves 16 and 17 are held against the keys 19. The spring 29 maintains the mold halves 16 and 17 against the keys 19. Inasmuch as there is considerable frictional contact between mold halves 16 and the keys 19, the mold half 16 is prevented from dropping when the molds are opened. However, when the mold arms are closed, the spring 29 will be compressed and the two members 27 and 28 will contact each other and hold the mold halves 16 and 17 together with, in effect, a rigid pin 26. Also, during closing of the mold halves 16 and 17 and due to the compression of the spring 29, the mold halves will be moved away from the keys 19. When the mold arms 10 and 11 begin to open, the spring 29 maintains the two halves together until the keys 19 seat in the keyways 20 on the mold halves 16 and 17 at which time the arms will carry the mold halves apart. By providing closely machined keyways 20 in the mold halves 16 and 17, the alignment of the faces of the mold halves 16 and 17, during closing, will be assured. This prevents the mold halves 16 and 17 from sluing around within the mold arms while the faces are meeting along the parting line. Also accurate machining of keys 19 into the arms makes it possible to bring the molds closed in such a fashion that the faces are parallel and will require a minimum of angular or sideway motion to align themselves with each other and any other registering member.

Thus it can be seen that applicant has provided apparatus for supporting mold elements within their mold supporting arms which will prevent the molds from shifting axially after the molds are opened and also maintains the molds in position for closing along a parting line which is parallel to the face of the mold arms. Furthermore, applicant has provided apparatus which prevents the mold halves from becoming misaligned through frictional drag on the bottom plates or neck molds during the opening of the molds.

Various modifications may be resorted to within the spirit and scope of the appended claims.

I claim:
1. Blow mold apparatus comprising a pair of mold arms mounted for pivotal movement about a common vertical axis toward and away from each other, a semi-cylindrical recess formed in each mold arm in opposing relationship, semi-cylindrical blow mold halves loosely mounted in each recess, means for retaining said mold halves in said recesses but permitting slight horizontal movement thereof relative to said arms, a horizontal pin extending through each mold arm and having its inner end in contact with the mold half retained in the arm, the outer ends of said pins being held against axial movement in each said arm, said pin comprising two loosely interlocked members in axial alignment, and spring means interposed between said members for biasing said members away from each other, whereby said spring will bias said members apart when said mold arms are opened, and said members are in contact when said mold arms are closed.

2. Apparatus for forming glass articles comprising a pair of mold arms mounted for movement toward and away from each other, said mold arms having complementary semi-cylindrical vertical recesses formed in their faces, a semi-cylindrical mold half mounted in each recess, said mold halves being axially shiftable in an upward direction within said mold arm recesses, a pair of vertical keys fixed to the front face of said mold arms and having an edge thereof overlying a portion of said recesses, said mold halves having vertical keyways formed in the outer edge thereof within which said keys are adapted to extend, a pair of pins extending through diametrically opposed openings formed in said arms, said pins having their inner ends in abutting relationship to their respective mold halves and their outer ends being held against axial movement in said mold arms, said pins further comprising two loosely interlocked axially aligned members, a compression spring disposed between said members, the axial clearance between said members being proportioned so that upon closing said mold arms, the two members are in contact and upon opening of said mold arms, they will separate and maintain said mold halves in contact with the keys carried by the arms.

3. Apparatus for forming hollow glass articles comprising a pair of split blow molds, a pair of mold arms mounted for swinging movement toward and away from each other, each said mold arm having a pair of parallel vertical mold supporting recesses formed therein, the recesses on one arm being complementary to the recesses in the other arm, four semi-cylindrical mold halves, means for loosely retaining a mold half in each recess, said retaining means comprising a pair of vertical keys fixed to the front face of said arms and having an edge thereof extending into vertical keyways formed in the front face of each mold half, means extending horizontally through each mold arm and contacting the back of a mold half for biasing said mold halves against said keys, and means centrally pivoted to said arms and contacting the other ends of the horizontally extending means in each mold arm, whereby equal bias will be applied to the mold halves carried by each arm.

4. The apparatus of claim 3 wherein said biasing means comprises a pin formed of two axially aligned members, and a compression spring interposed therebetween for biasing said members apart axially.

5. Apparatus for forming hollow glass articles comprising a pair of mold arms mounted for swinging movement toward and away from each other, each said mold arm having a pair of parallel vertical mold supporting recesses formed therein, the recesses on one arm being complementary to the recesses in the other arm, four semi-cylindrical mold halves, means for loosely retaining a mold half in each recess, a two-piece pin extending horizontally through openings in each mold arm with one piece contacting the back of its respective mold half and the other piece extending beyond the outer surface of the mold arm, said pieces being in axial alignment, equalizer bars pivotally mounted intermediate their ends to each said mold arm and having their ends in overlying relationship with respect to the extending, outer ends of said other pieces of said pins that are in horizontal side-by-side relationship and means interposed between the pieces of said pins for biasing said pieces away from each other.

6. Apparatus for forming glass articles wherein split forming molds are loosely retained within complementary recesses of mold carrying arms, the improvement comprising a two-piece biasing pin loosely retained in each mold arm with one end contacting the back of the mold half and the other end restrained in relation to the mold arm, said pieces of said pins being in axial alignment, spring means positioned between the two pieces of the pins for biasing said pieces away from each other, and interlocking means formed in the adjacent ends of said pins for permitting limited axial movement of one piece in relation to the other with the length of said pieces being such that when the molds are closed the two pieces will be in contact with each other.

References Cited by the Examiner
UNITED STATES PATENTS

| | | | |
|---|---|---|---|
| 1,729,363 | 9/1929 | Schwenzfeier | 65—323 |
| 2,508,890 | 5/1950 | Rowe | 65—158 |
| 2,949,701 | 8/1960 | Olson et al. | 65—235 |
| 3,021,644 | 2/1962 | Lauck | 65—361 |

S. LEON BASHORE, *Acting Primary Examiner.*

DONALL H. SYLVESTER, *Examiner.*

D. CRUPAIN, *Assistant Examiner.*